United States Patent
Saether et al.

(10) Patent No.: US 8,379,012 B2
(45) Date of Patent: Feb. 19, 2013

(54) SELECTOR SWITCH FOR DIRECT CONNECTION OF SWITCHED REGULATOR TO VOLTAGE INPUTS

(75) Inventors: Terje Saether, Trondheim (NO); Morten Werner Lund, Flataasen (NO)

(73) Assignee: Atmel Corporation, San Jose, CA (US)

( * ) Notice: Subject to any disclaimer, the term of this patent is extended or adjusted under 35 U.S.C. 154(b) by 867 days.

(21) Appl. No.: 12/505,190

(22) Filed: Jul. 17, 2009

(65) Prior Publication Data

US 2011/0012886 A1    Jan. 20, 2011

(51) Int. Cl.
*G06F 3/038* (2006.01)
*G09G 5/00* (2006.01)

(52) U.S. Cl. .......... 345/212; 345/211; 345/89; 345/100; 345/204

(58) Field of Classification Search ............ 345/87–104, 345/204–215; 348/14.01–14.16, 21–844
See application file for complete search history.

(56) References Cited

U.S. PATENT DOCUMENTS

| | | | | |
|---|---|---|---|---|
| 4,694,350 A * | 9/1987 | Hinn | | 348/379 |
| 5,130,703 A * | 7/1992 | Fairbanks et al. | | 345/94 |
| 5,331,354 A * | 7/1994 | Koyama et al. | | 348/730 |
| 7,675,245 B2 * | 3/2010 | Szczeszynski et al. | | 315/291 |
| 8,125,431 B2 * | 2/2012 | Kimura et al. | | 345/95 |
| 2008/0191976 A1 * | 8/2008 | Nathan et al. | | 345/76 |
| 2008/0316154 A1 * | 12/2008 | Kim | | 345/87 |
| 2011/0128303 A1 * | 6/2011 | Yonemaru et al. | | 345/690 |

* cited by examiner

*Primary Examiner* — Lun-Yi Lao
*Assistant Examiner* — Gene W Lee
(74) *Attorney, Agent, or Firm* — Fish & Richardson P.C.

(57) ABSTRACT

A driver circuit for a display device (e.g., an LCD) omits buffers and a resistive ladder and connects the output of a switched regulator directly to a display device through a selector switch. Voltage inputs for the display device can be selectively coupled to the output of the switched regulator using the selector switch. Each voltage input can be coupled to a capacitor that is charged when the corresponding voltage input is coupled to the high voltage output of the switched regulator. In some implementations, bypass switches are connected between the voltage inputs. If the voltage of a given capacitor is too high, the excess voltage can be transferred or otherwise discharged through the bypass switch to another capacitor storing a lower voltage.

12 Claims, 4 Drawing Sheets

SELECTOR SWITCH FOR DIRECT CONNECTION OF SWITCHED REGULATOR TO VOLTAGE INPUTS

TECHNICAL FIELD

This subject matter is generally related to electronics, and more particularly to a driver circuit for a display device, such as a Liquid Crystal Display (LCD).

BACKGROUND

A conventional LCD panel usually requires several different voltage levels dependent on the complexity of the LCD panel. These different voltage levels can be accomplished by dividing a high voltage provided at the output of a switched regulator (e.g., capacitor or inductor) by some means (e.g., a resistor ladder). The divided voltages can be optionally driven by buffers for better power efficiency. If the LCD panel is small or the power consumption is not important the buffers can be omitted by sizing the resistor string appropriately. The voltages can be smoothed by decoupling capacitors or omitted if power efficiency is not required. The high voltage output by the switched regulator is generally controlled by a voltage divider which, in turn, controls the contrast of the LCD panel. In some designs, the voltage divider and resistor string can be combined into a single circuit. When the voltage output from the voltage divider is lower than the reference voltage a comparator can be used to turn on the switched regulator and increase the high voltage output by the switched regulator to the desire level required by the LCD panel. In conventional designs, power can be lost in the switched regulator, the resistor string, the voltage divider and the buffers.

SUMMARY

A driver circuit for a display device (e.g., an LCD) omits buffers and a resistive ladder and connects the output of a switched regulator directly to a display device through a selector switch. Voltage inputs for the display device can be selectively coupled to the output of the switched regulator using the selector switch. Each voltage input can be coupled to a capacitor that is charged when the corresponding voltage input is coupled to the high voltage output of the switched regulator. In some implementations, bypass switches are connected between the voltage inputs. If the voltage of a given capacitor is too high, the excess voltage can be transferred or otherwise discharged through the bypass switch to another capacitor storing a lower voltage.

Conventional driver circuits boost the voltage and then divide the boosted voltage through a resistive ladder and optionally buffers which can waste energy. The disclosed driver circuit omits buffers and a resistive ladder. In the disclosed driver, the high voltage output of the switched regulator is coupled directly to the voltage input terminals of the display device, thus conserving energy that would otherwise be lost due to buffers and a resistive ladder.

DETAILED DESCRIPTION

Display Driver Overview

Figure 1:
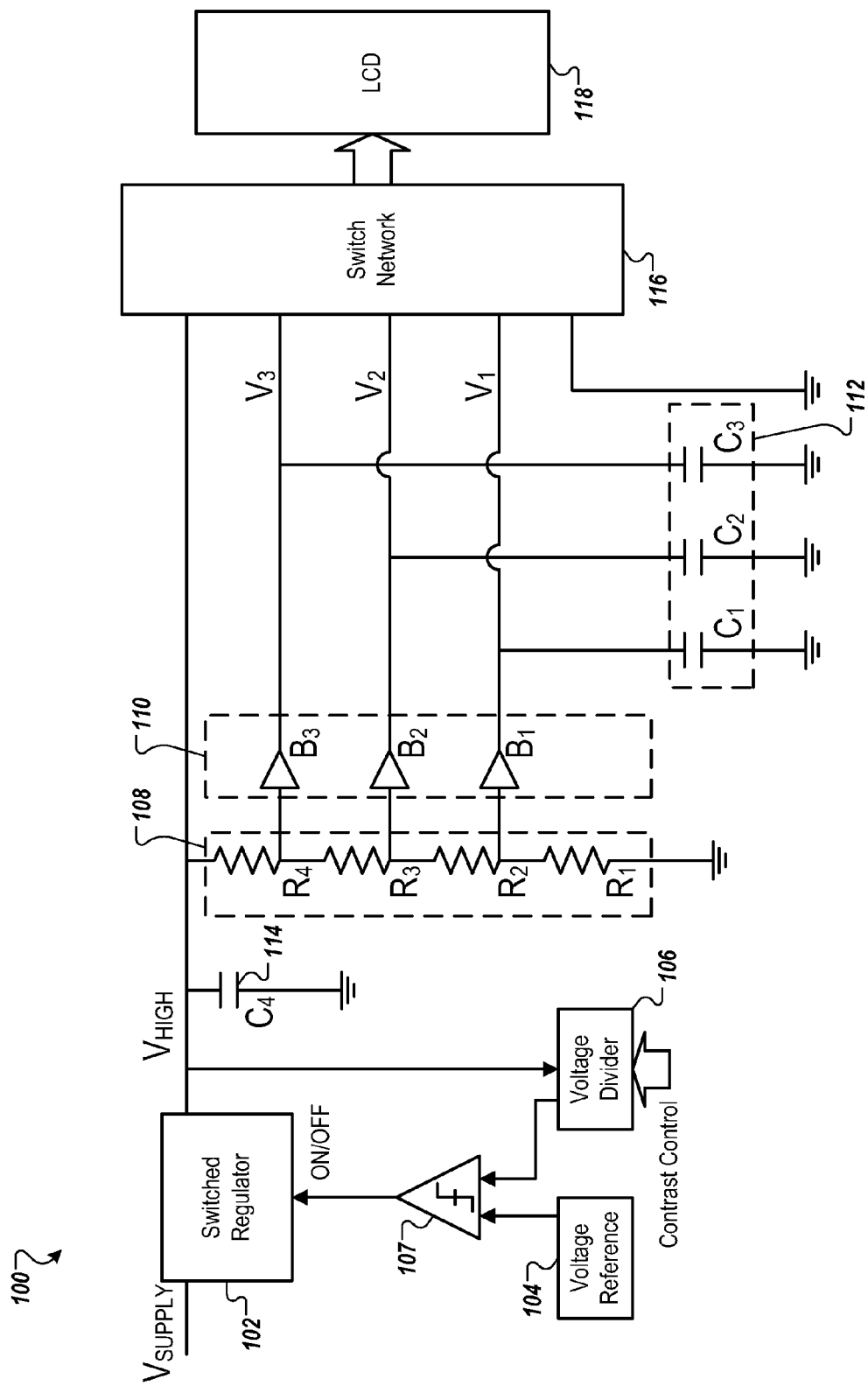
FIG. 1 is a schematic diagram of a display driver including a switched regulator coupled to a switch network through a resistive ladder and buffers.

FIG. 1 is a schematic diagram of display driver, including a switched regulator coupled to a switch network through a resistive ladder and buffers. In some implementations, display driver 100 can include switched regulator 102, voltage reference 104, voltage divider 106, comparator 107, resistive ladder 108, buffers 110, decoupling capacitors 112, smoothing capacitor 114, switch network 116 and display device 118.

Display device 118 (e.g., an LCD panel) is configured to use several different voltage levels based on the design of display device 118. The different voltage levels can be provided by dividing a high voltage output of switched regulator 102, $V_{HIGH}$, by resistive ladder 108 ($R_1$-$R_4$). In the example display driver 100, display device 118 uses five voltages (0, $V_1$, $V_2$, $V_3$, $V_{HIGH}$). The divided voltages are driven by buffers 110 ($B_1$-$B_3$) for better power efficiency. If the display device is small or the power consumption is not important buffers 110 can be omitted by sizing resistive ladder 108 appropriately. The voltages can be smoothed by decoupling capacitors 12 ($C_1$-$C_3$). If power efficiency is not required the decoupling capacitors can be omitted. Capacitor 114 ($C_4$) can be used for smoothing high voltage output from switched regulator 102.

In some implementations, the output voltage, $V_{HIGH}$, can be controlled by voltage divider 106 which, in turn, can control the contrast of the display device 118. In some implementations, voltage divider 106 and resistive ladder 108 can be combined. When voltage output by voltage divider 106 is lower than reference voltage 104, comparator 107 turns on switched regulator 102 and increases $V_{HIGH}$ to a desired level. In this example, an on/off regulator control is used. Other means of control duty cycle is possible.

Power is lost in switched regulator 102, restive ladder 108, voltage divider 106 and buffers 110. When buffers 110 have to source a current the output power is can be given by $$P_{OUT} = V_{OUT} * I_{OUT}. \qquad (1)$$

The power used by buffers 110 can be given by $$P_{IN} = V_{HIGH} * I_{IN}, \qquad (2)$$

and the efficiency is given by as $$\eta = \frac{P_{OUT}}{P_{IN}} = \frac{I_{OUT}}{I_{IN}} * \frac{V_{OUT}}{V_{HIGH}}. \qquad (3)$$

Some current is used by buffers 110, $$I_{OUT} = I_{IN} - I_{BUFFER} = \alpha * I_{IN}, \qquad (4)$$

where α is the efficiency of buffers 110. The efficiency of buffers 110 can be quite high and with large decoupling capacitors 112 the efficiency can be close to 100%. However, most buffers have an efficiency of about 90% (α=0.9) due to other design constraints. The largest loss can be due to the output voltage, which on average can be $V_{HIGH}/2$, which leads to a loss of 50%.

Exemplary Display Driver

Figure 2:
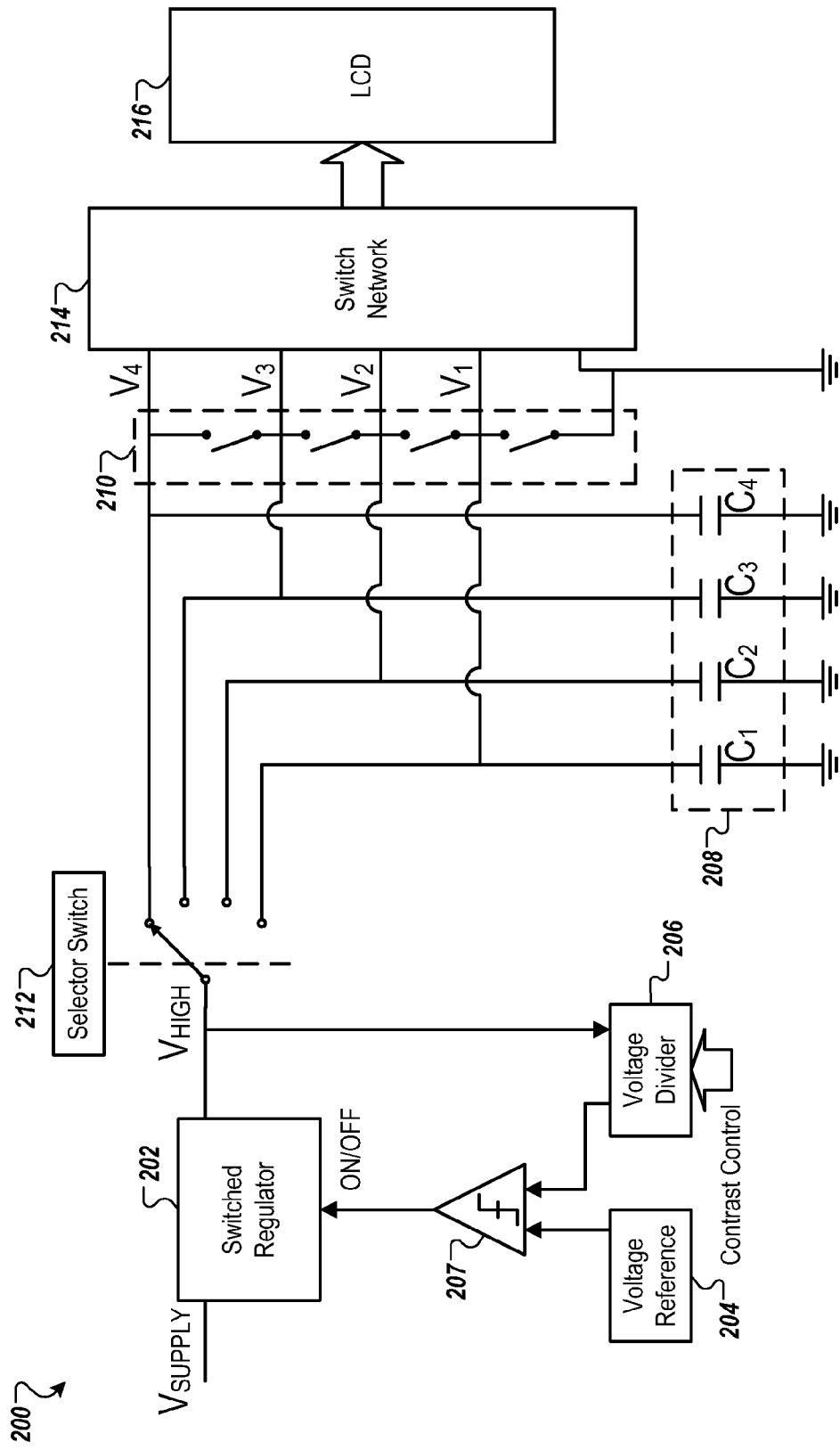
FIG. 2 is a schematic diagram of an exemplary display driver including a switched regulator coupled directly to a switch network.

FIG. 2 is a schematic diagram of an exemplary display driver, including a switched regulator coupled directly to a switch network. In some implementations, display driver 200 can include switched regulator 202, voltage reference 204, voltage divider 206, comparator 207, decoupling capacitors 208, bypass switches 210, selector switch control 212, switch network 216 and display device 218.

Display driver 200 omits buffers 110 and connects the output from switched regulator 202 directly to switch network 214 and display device 216 through selector switch 212. With this configuration, the voltages $V_1$-$V_4$ are controlled directly by adjusting the contrast control for each voltage input (e.g., using voltage divider 206). Selector switch 212 selects one output at a time and charges or optionally discharges decoupling capacitors 208 ($C_1$-$C_4$) as required. If decoupling capacitors 208 are small, switched regulator 102 can update decoupling capacitors 208 often and the resulting switching losses can be larger. A key advantage with display driver 200 is that there is no longer power loss due to buffers.

In some implementations, bypass switches 210 can be included for connecting between different voltage inputs. For example, if a given decoupling capacitor voltage is too high, the excess voltage can be transferred or discharged to another decoupling capacitor which has a lower voltage. The switching can be controlled by selector switch 212 or another controller or logic. Similar to capacitor $C_4$ in display driver 100, the capacitor $C_4$ can be used as a smoothing capacitor for output voltage $V_{HIGH}$.

Selector switch 212 can be implemented using hardware and/or software. For example, selector switch can be implemented using a controller or logic. Selector switch 212 can be operated based on a state machine or software or firmware instructions.

Exemplary Switched Regulator

Figure 3:
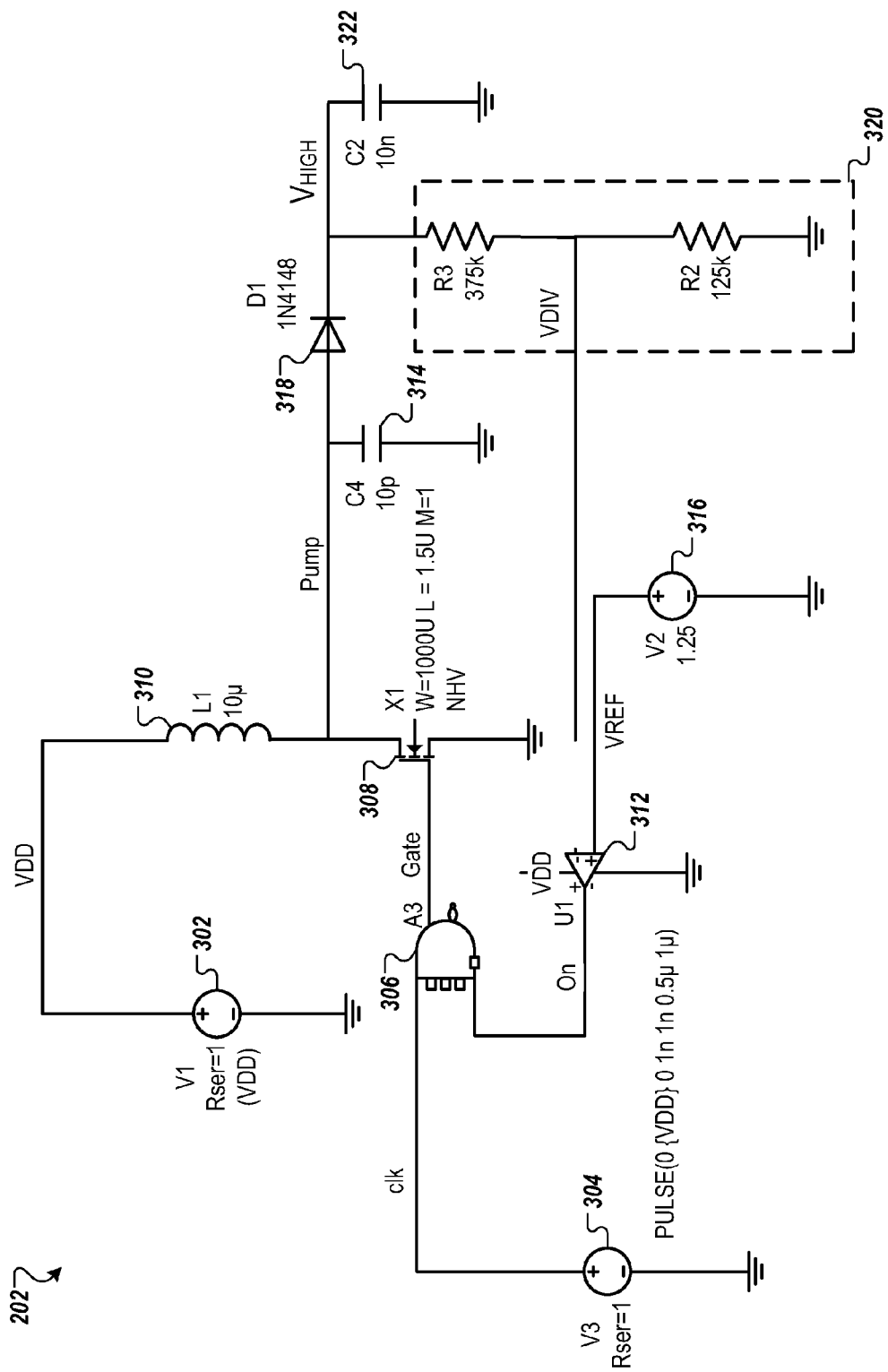
FIG. 3 is a schematic diagram of an exemplary inductive-type switched regulator.

FIG. 3 is a schematic diagram of an exemplary inductive-type switched regulator. In some implementations, an inductive-type switched regulator 202 includes voltage source 302 ($V_1$), clock 304 ($V_3$), gate 306 ($A_3$), transistor 308 ($X_1$), inductor 310 ($L_1$), comparator 312 ($U_1$), capacitor 314 ($C_4$), voltage reference 316 ($V_2$), diode 318 ($D_1$), voltage divider 320 ($R_2$, $R_3$) and capacitor 324 ($C_2$).

In some implementations, a small and simple inductive boost regulator 202 can be used in display driver 200. When the output of voltage divider 320 is smaller than the reference voltage 316, comparator 312 output is high and transistor 308 is turned on and off through gate 306 with a frequency set by clock 304. When transistor 308 is turned on capacitor 314 charges. Diode 318 in combination with capacitor 322 provides a DC output voltage $V_{HIGH}$, which can be supplied to switch network 214.

The voltage divider can include resistors 320, 322 which can be set so that the output voltage $V_{OUT}$ is V volts (e.g., 5 volts). The voltage divider 320 in this example circuit is resistive but in some circuits a capacitive voltage divider can be used to save current consumption and silicon area. When the voltage output by the voltage divider 320 is equal to the reference voltage 316, the output of comparator 312 goes low and the pumping stops. Capacitor 322 smoothes the output voltage $V_{OUT}$.

Exemplary Display Driver Process

Figure 4:
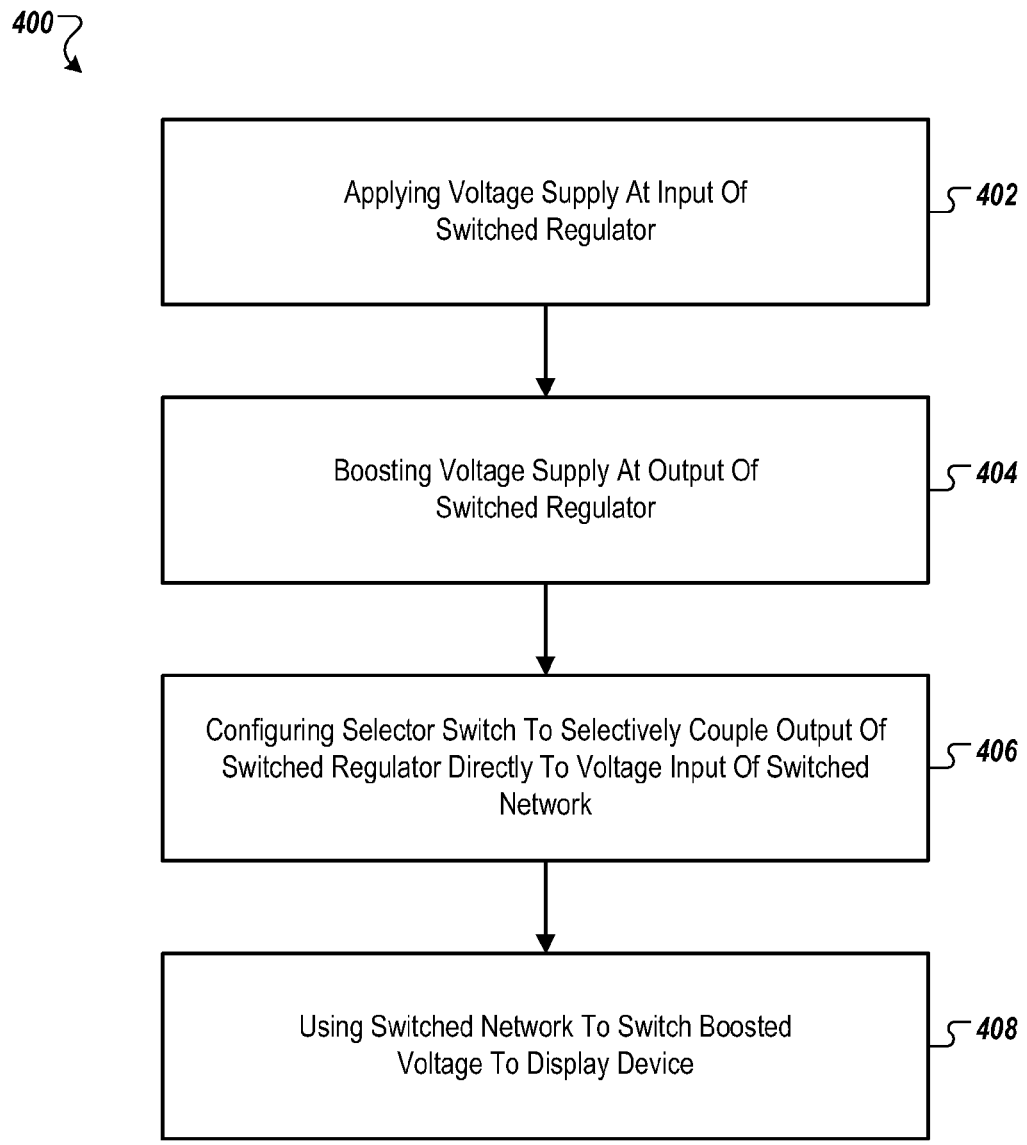
FIG. 4 is a flow diagram of an exemplary process for switching boosted voltage to a display device.

FIG. 4 is a flow diagram of an exemplary process for switching boosted voltage to a display device. In some implementations, a process 400 can begin by applying a voltage supply to an input of a switched regulator (402). The switched regulator boosts the voltage to a desired level (404). The switched regulator can be a capacitive-type or inductive-type switched regulator. A selector switch can be configured to selectively couple the output of the switched regulator directly to a voltage input of a switch network (406). The switch network can couple the boosted voltage to a display device (408). A decoupling capacitor can be coupled to each voltage input of the switch network and can store the boosted voltage output by the switched regulator.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A driver circuit for a display device, comprising:
   a switched regulator configured for providing a source voltage;
   a switch network having a number of voltage inputs, the voltage inputs selectively coupled to the switched regulator to receive the source voltage, where each voltage input of the switched network is coupled to a capacitor that is configured to be charged by the source voltage; and
   a selector switch coupled to the switched regulator, the selector switch operable for selecting one of the voltage inputs for coupling directly to the source voltage.

2. The driver circuit of claim 1, further comprising:
   at least one bypass switch configurable for coupling together at least two of the voltage inputs of the switch network.

3. The driver circuit of claim 1, further comprising:
   a comparator having first input configured for coupling to a voltage reference and a second input configured for coupling to a voltage divider and an output, the output coupled to the switched regulator, the comparator configurable to provide an output signal based on a comparison of the voltage reference and an output voltage of the voltage divider.

4. The driver circuit of claim 1, further comprising:
   a display device coupled to the switch network.

5. The driver circuit of claim 4 where the display device is a Liquid Crystal Display (LCD) panel.

6. The driver circuit of claim 3, further comprising:
   a contrast control configured for directly adjusting voltages on the voltage inputs.

7. The driver circuit of claim 1, where the switched regulator is an inductive type switched regulator.

8. A method of driving a display device, comprising:
   generating a voltage using a switched regulator; and
   selectively coupling the voltage regulator to voltage inputs of a switch network coupled to the display device; and
   selecting one of the voltage inputs for coupling directly to the voltage.

9. The method of claim 8, further comprising:
charging a capacitor coupled to the selected voltage input.

10. The method of claim 8, further comprising:
comparing a voltage reference to an output of a voltage divider coupled to the voltage; and
generating a signal based on results of the comparison, the signal for activating or deactivating the voltage.

11. The method of claim 8, further comprising:
a display device having an input coupled to an output of the switch network.

12. The method of claim 8 where the display device is a Liquid Crystal Display (LCD) panel.

* * * * *